(12) United States Patent
Choi et al.

(10) Patent No.: US 11,807,161 B2
(45) Date of Patent: Nov. 7, 2023

(54) LIGHT CONTROLLER FOR VEHICLE, VEHICLE SYSTEM INCLUDING THE SAME, AND METHOD THEREOF

(71) Applicants: Hyundai Motor Company, Seoul (KR); Kia Motors Corporation, Seoul (KR)

(72) Inventors: Jae Kyung Choi, Gyeongsangnam-do (KR); Choong Sik Kim, Seoul (KR); Jae Woong Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 474 days.

(21) Appl. No.: 17/036,256

(22) Filed: Sep. 29, 2020

(65) Prior Publication Data
US 2021/0354624 A1    Nov. 18, 2021

(30) Foreign Application Priority Data

May 15, 2020    (KR) ........................ 10-2020-0058457

(51) Int. Cl.
| | |
|---|---|
| *B60Q 3/74* | (2017.01) |
| *B60Q 3/20* | (2017.01) |
| *G07B 15/02* | (2011.01) |
| *H05B 47/105* | (2020.01) |
| *B60Q 9/00* | (2006.01) |
| *B60Q 3/80* | (2017.01) |
| *G06Q 20/08* | (2012.01) |
| *G05D 1/00* | (2006.01) |

(52) U.S. Cl.
CPC ............... *B60Q 3/74* (2017.02); *B60Q 3/20* (2017.02); *B60Q 3/80* (2017.02); *B60Q 9/00* (2013.01); *G06Q 20/085* (2013.01); *G07B 15/02* (2013.01); *H05B 47/105* (2020.01); *G05D 1/0088* (2013.01); *G06Q 2240/00* (2013.01)

(58) Field of Classification Search
CPC ... B60Q 3/74; B60Q 3/20; B60Q 3/80; B60Q 9/00; B60Q 3/731; B60Q 1/503; B60Q 3/70; B60Q 5/005; G06Q 20/085; G06Q 2240/00; G06Q 50/30; G07B 15/02; H05B 47/105; H05B 47/115; G05D 1/0088; Y02B 20/40; G07F 17/00; B60W 50/14; B60W 60/0025; B60W 2050/143
See application file for complete search history.

(56) References Cited

U.S. PATENT DOCUMENTS

| | | | |
|---|---|---|---|
| 10,988,073 B1* | 4/2021 | Boyd | G06Q 10/02 |
| 2008/0117031 A1* | 5/2008 | Chiang | G07C 5/0891 |
| | | | 340/425.5 |
| 2019/0351768 A1* | 11/2019 | Salter | B60K 35/00 |
| 2020/0391763 A1* | 12/2020 | Yamamoto | B60N 2/002 |

FOREIGN PATENT DOCUMENTS

WO    WO-2021119526 A1 *    6/2021    ............... B62J 6/01

\* cited by examiner

*Primary Examiner* — Renan Luque
(74) *Attorney, Agent, or Firm* — Fox Rothschild LLP

(57) ABSTRACT

A light controller for a vehicle includes a processor that controls an operation of a light device in the vehicle depending on a driving situation and a situation of paying a fare for use of the vehicle and a storage configured to store data for driving of the processor.

20 Claims, 6 Drawing Sheets

LIGHT CONTROLLER FOR VEHICLE, VEHICLE SYSTEM INCLUDING THE SAME, AND METHOD THEREOF

CROSS-REFERENCE TO RELATED APPLICATION

This application claims under 35 U.S.C. § 119(a) the benefit of Korean Patent Application No. 10-2020-0058457, filed in the Korean Intellectual Property Office on May 15, 2020, the entire contents of which are incorporated herein by reference.

BACKGROUND

(a) Technical Field

The present disclosure relates to a light controller for a vehicle, a system including the same, and a method thereof, more particularly, to arrangements for controlling a light device in an autonomous commercial vehicle to allow a passenger to recognize different types of information

(b) Description of the Related Art

Recently, with the development of autonomous vehicles, an autonomous commercial vehicle such as an autonomous robo-taxi has been developed.

After a customer rides in such an autonomous commercial vehicle, he or she may check driving situations, such as the remaining distance to a destination, by various electronic devices and may continue gazing at electronic devices or the peripheiy of windows to check whether the vehicle arrives at the destination Also, when the customer pays a service fare after the vehicle arrives at the destination, there is an inconvenience of separately having to check whether the fare payment succeeds by using the electronic device.

In addition, a conventional mood lamp system in the vehicle controls a color and brightness in the vehicle to satisfy the sensitivity of the driver of the vehicle. Such a mood lamp changes its color depending on the tendency and preference of the driver to increase an interior effect, but there is no function in the mood lamp.

SUMMARY

An aspect of the present disclosure provides a light controller for a vehicle for controlling a light device in the vehicle to allow a passenger to recognize different types of information, a system including the same, and a method thereof The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, a light controller for a vehicle may include a processor that controls an operation of a light device in the vehicle depending on a driving situation and a situation of paying a fare for use of the vehicle and a storage configured to store data for driving of the processor.

In an embodiment, the processor may control at least one of a brightness, a color, a blinking speed of the light device depending on a remaining distance to a destination In an embodiment, the processor may increase a brightness of the light device as a remaining distance to a destination is shorter.

In an embodiment, the processor may divide a remaining distance to a destination into predetermined intervals, and may adjust a brightness of the light device for each predetermined interval or may turn on the light device in a color divided for each predetermined interval.

In an embodiment, the processor may control a brightness or color of the light device to provide a notification that the driving situation is a dangerous situation or that the vehicle arrives at a destination, when the driving situation is the dangerous situation or when the vehicle arrives at the destination In an embodiment, the processor may increase the brightness of the light device to a maximum value or may increase a blinking speed of the light device, when the driving situation is the dangerous situation or when the vehicle arrives at the destination In an embodiment, the processor may control to output a voice for warning about the dangerous situation or providing a notification that the vehicle arrives at the destination, when the driving situation is the dangerous situation or when the vehicle arrives at the destination In an embodiment, the processor may turn on the light device in a first color, after the vehicle arrives at a destination and may enter a payment waiting stage to tum on the light device in a second color different from the first color.

In an embodiment, the processor may increase a brightness of the light device to a maximum value or controls the light device to blink, in the payment waiting stage.

In an embodiment, the processor may tum on the light device in a third color different from the second color, when payment is completed by a passenger of the vehicle.

In an embodiment, the processor may tum on the light device in a fourth color different from the third color, when the payment by the passenger fails or when approval for the payment is denied.

In an embodiment, the driving situation may include at least one of a change in remaining distance to a destination, when the driving situation is a dangerous situation, or whether the vehicle arrives at the destination According to an aspect of the present disclosure, a vehicle system may include a light device in a vehicle and a light controller that controls an operation of the light device depending on a driving situation and a situation of paying a fare for use of the vehicle.

In an embodiment, the light controller may control on/off, a color, a brightness, and blinking of the light controller depending on at least one of a change in remaining distance to a destination, whether the driving situation is a dangerous situation, or whether the vehicle arrives at the destination According to an aspect of the present disclosure, a light control method for a vehicle may include determining, by a light controller, a driving situation or a situation of paying a fare for use of the vehicle and controlling by a light controller, an operation of a light device in the vehicle depending on the driving situation and the situation of paying the fare for use of the vehicle.

In an embodiment, the controlling of the operation of the light device in the vehicle may include increasing a brightness of the light device as a remaining distance to a destination is shorter.

In an embodiment, the controlling of the operation of the light device in the vehicle may include increasing a brightness of the light device to a maximum value or increasing a blinking speed of the light device, when the driving situation is a dangerous situation or when the vehicle arrives at a destination.

In an embodiment, the controlling of the operation of the light device in the vehicle may include turning on the light device in a first color, after the vehicle arrives at a destination, entering a payment waiting stage for guiding a passenger of the vehicle to pay to turn on the light device in a second color different from the first color, and turning on the light device in a third color different from the second color, when payment is completed by the passenger.

In an embodiment, the controlling of the operation of the light device in the vehicle may further include turning on the light device in a fourth color different from the third color, when the payment by the passenger fails or when approval for the payment is denied.

In an embodiment, the method may further include providing a voice output when controlling the operation of the light device in the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
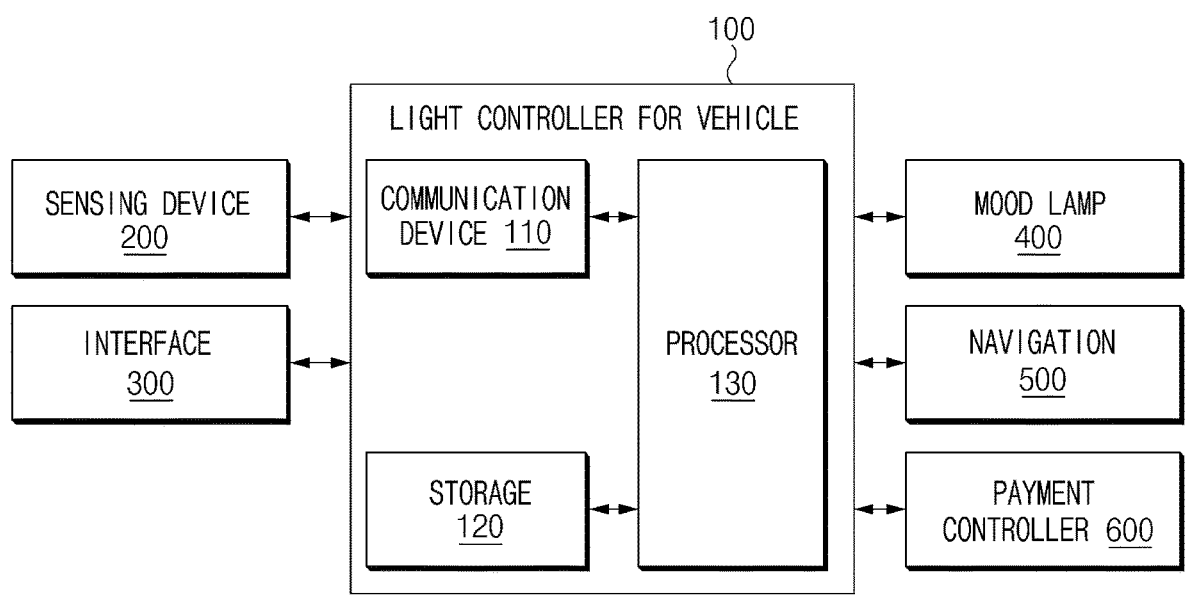
FIG. 1 is a block diagram illustrating a configuration of a vehicle system including a light controller for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application An embodiment of the present disclosure may disclose technologies of, when a consumer rids in an autonomous commercial vehicle such as an autonomous robo-taxi, controlling an operation of a mood lamp in the vehicle and notifying the consumer of a driving situation and a process of paying a service fare, thus enhancing marketability.

Hereinafter, embodiments of the present disclosure will be described in detail with reference to FIGS. 1 to 6.

FIG. 1 is a block diagram illustrating a configuration of a vehicle system including a light controller for a vehicle according to an embodiment of the present disclosure.

Referring to FIG. 1, the vehicle system may include a light controller 100 for a vehicle, a sensing device 200, an interface 300, a mood lamp 400, a navigation 500, a payment controller 600. The vehicle system of FIG. 1 may be loaded into a commercial vehicle such as an autonomous robo-taxi.

The light controller 100 for a vehicle according to an embodiment of the present disclosure may be implemented in the vehicle. In this case, the light controller 100 for the vehicle may be integrally configured with control units in the vehicle or may be implemented as a separate device to be connected with the control units of the vehicle by a separate connection arrangement. Further, the light controller 100 for the vehicle may be implemented as a mood lamp control module (VILM).

The light controller 100 for the vehicle may adjust at least one of a color of a mood lamp of the vehicle, whether the mood lamp is turned on, a brightness of the mood lamp, or blinking of the mood lamp such that a passenger of the vehicle may intuitively recognize a driving situation (e.g., a remaining distance to a destination or whether the vehicle arrives at the destination) and a payment situation (e.g., payment failed, or the like).

To this end, the light controller 100 for the vehicle may include a communication device 110, a storage 120, and a processor 130.

The communication device 110 may be a hardware device implemented with various electronic circuits to transmit and receive a signal through a wireless or wired connection. In an embodiment of the present disclosure, the communication device 110 may perform a network communication technology in the vehicle and may perform vehicle-to-infrastructure (V2I) communication with a server, an infrastructure, or another vehicle outside the vehicle using wireless Internet technology or short range communication technology. Herein, the network communication technology in the vehicle may be to perform inter-vehicle communication through controller area network (CAN) communication, local interconnect network (LIN) communication, flex-ray communication, or the like. Further, the wireless Internet technology may include wireless local area network (WLAN), wireless broadband (WiBro), wireless-fidelity (Wi-Fi), world interoperability for microwave access (WiMAX), or the like. Further, the short range communication technology may include Bluetooth, ZigBee, ultra wideband (UWB), radio frequency identification (RFID), infrared data association (IrDA), or the like.

As an example, the communication device 110 may communicate with the navigation 500 to receive information about a remaining distance to a destination, destination arrival information, or the like and receive a sensing result of the sensing device 200.

As an example, the communication device 110 may receive traffic accident information, road information, or the like from a traffic center or another vehicle outside the vehicle.

The storage 120 may store a sensing result of the sensing device 200, traffic accident information and road information outside the vehicle, which are received by the communication device 110, or data obtained by the processor 130, and may store data and/or an algorithm necessary for an operation of the light controller 100 for the vehicle, or the like.

As an example, the storage 120 may store information about a location of the vehicle, information about a road, and the like, which are received via the navigation 500 or the like. Further, the storage 120 may store accident information, road construction information, or the like, which is received through vehicle-to-everything (V2X) communication. Further, the storage 120 may store information about a front obstacle detected by the sensing device 200.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below. The processor 130 may be, for example, an electronic control unit (ECU), a micro controller unit (MCU), or another sub-controller, which is loaded into the vehicle.

The processor 130 may control operation of the mood lamp 400, which is a light device in the vehicle, depending on a driving situation or a situation for paying a fare for use of the vehicle. In this case, the driving situation may include at least one of a change in remaining distance to a destination, whether the driving situation is a dangerous situation, or whether the vehicle arrives at the destination The processor 130 may control at least one of a brightness, a color, or a blinking speed of the mood lamp 400 depending on the remaining distance to the destination. In this case, the mood lamp 400 may include a door mood lamp, a console mood lamp, and a crash pad mood lamp. The processor 130 may collectively control all of mood lamps, such as the door mood lamp, the console mood lamp, and the crash pad mood lamp, in the vehicle at the same time or may control some of the mood lamps depending on a situation.

As the remaining distance to the destination is shorter, the processor 130 may increase a brightness of the light device. In other words, the processor 130 may divide the remaining distance to the destination into predetermined intervals, and may adjust a brightness of the mood lamp 400 for each predetermined interval or may turn on the mood lamp in a color divided for each predetermined interval. For example, the processor 130 may divide the remaining distance to the destination into five intervals, may differently determine a color for each interval, and may turn on the mood lamp 400 in a corresponding color when the vehicle enters a corresponding interval. Further, the processor 130 may divide the remaining distance to the destination into five intervals, may differently determine a degree of brightness for each interval, may set a brightness of the mood lamp 400 as a corresponding brightness when the vehicle enters a corresponding interval, and may adjust the brightness of the mood lamp 400 to be brighter or darker as the remaining distance to the destination is closer.

The processor 130 may determine whether the driving situation is a dangerous situation. When the driving situation is the dangerous situation or when the vehicle arrives at the destination, the processor 130 may control a brightness or color of the mood lamp 400 to notify a passenger that the driving situation is the dangerous situation or that the vehicle arrives at the destination. In this case, the processor 130 may determine a dangerous situation using vehicle warning signals such as an airbag signal, a tire pressure monitoring system (TPMS) signal, information by the sensing device 200, and a collision signal.

When the driving situation is the dangerous situation or when the vehicle arrives at the destination, the processor 130 may increase the brightness of the mood lamp 400 to a maximum value or may increase a blinking speed of the mood lamp 400. In other words, when the driving situation is the dangerous situation or when the vehicle arrives at the destination, the processor 130 may allow the mood lamp 400 to quickly blink such that the passenger may recognize the blinking of the mood lamp 400.

When the driving situation is the dangerous situation or when the vehicle arrives at the destination, the processor 130 may control to output a voice for warning of the dangerous situation or providing a notification that the vehicle arrives at the destination. The processor 130 may interwork with an output device such as an audio video navigation (AVN) or a cluster to provide a voice output. In this case, the voice output may be: "There is a dangerous situation"

The processor 130 may turn on the mood lamp 400 in a first color (e.g., a yellow color) after the vehicle arrives at the destination and may enter a payment waiting stage for guiding a passenger to pay to turn on the mood lamp 400 in a second color (e.g., an orange color) different from the first color. Further, in the payment waiting stage, the processor 130 may increase a brightness of the mood lamp 400 to a maximum value or may control the mood lamp 400 to blink to guide the passenger to quickly pay.

When the payment is completed by the passenger, the processor 130 may turn on the mood lamp 400 in a third color (e.g., a green color) different from the second color. Herein, when the payment by the passenger fails or when approval for the payment is denied, the processor 130 may turn on the mood lamp 400 in a fourth color (e.g., a red color) different from the third color. The processor 130 may interwork with the interface 300 to provide the voice output such as: "The payment has been completed," or "The payment has failed," such that the passenger may accurately recognize the payment situation Thus, the passenger may re-attempt to pay. When the payment succeeds, the processor 130 may drive the mood lamp 400 in a general mode (an idle driving mode where a customer does not ride).

An embodiment of the present disclosure is exemplified as the passenger may know the driving situation and the payment situation by use of the mood lamp. However, another embodiment of the present disclosure may interwork with an electronic device, such as a cluster or an AVN, in the vehicle as well as the mood lamp, such that the passenger may more accurately recognize the driving situation and the payment situation The sensing device 200 may include one or more sensors, each of which measures a distance from an obstacle located around the vehicle and a relative speed of the obstacle, for example, an obstacle in front of the vehicle.

The sensing device 200 may have a plurality of sensors for sensing objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like. In an embodiment of the present disclosure, the processor 130 may determine a dangerous situation based on the result sensed by the sensing device 200.

The interface 300 may include an input means for receiving a control command from a user and an output means for outputting an operation state, an operation result, or the like of the light controller 100.

Herein, the input means may include a key button and may further include a mouse, a joystick, a jog shuttle, a stylus pen, or the like. Further, the input means may further include a soft key implemented on a display.

The output means may include the display and may further include a voice output means such as a speaker. In this case, a touch sensor such as a touch film, a touch sheet, or a touch pad is provided in the display, the display operates as a touchscreen and may be implemented in a form where the input means and the output means are integrated with each other. In an embodiment of the present disclosure, the output means may output a voice to notify the passenger of a dangerous situation, a destination arrival situation, or the like.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The mood lamp 400 may be a courtesy light in the vehicle to provide an interior effect and may be controlled by the light controller 100 to be controlled in color, brightness, blinking, or the like.

The mood lamp 400 may be adjusted in color and brightness by the light controller 100 for the vehicle, which is a leader, and may be provided as at least one follower in the vehicle. The mood lamp 400 may be an example of a door mood lamp and may include a console mood lamp, a crash pad mood lamp, or the like.

The navigation 500 may provide the light controller 100 for the vehicle with information about a route to a destination, information about a remaining distance to the destination, an estimated time of arrival to the destination, road information, and the like.

The payment controller 600 may pay a fare of the passenger by various forms of payment, such as cash, near field communication (NFC), a card, Bluetooth, and blockchain, and may provide the light controller 100 for the vehicle with information indicating whether the payment succeeds.

Figure 2:
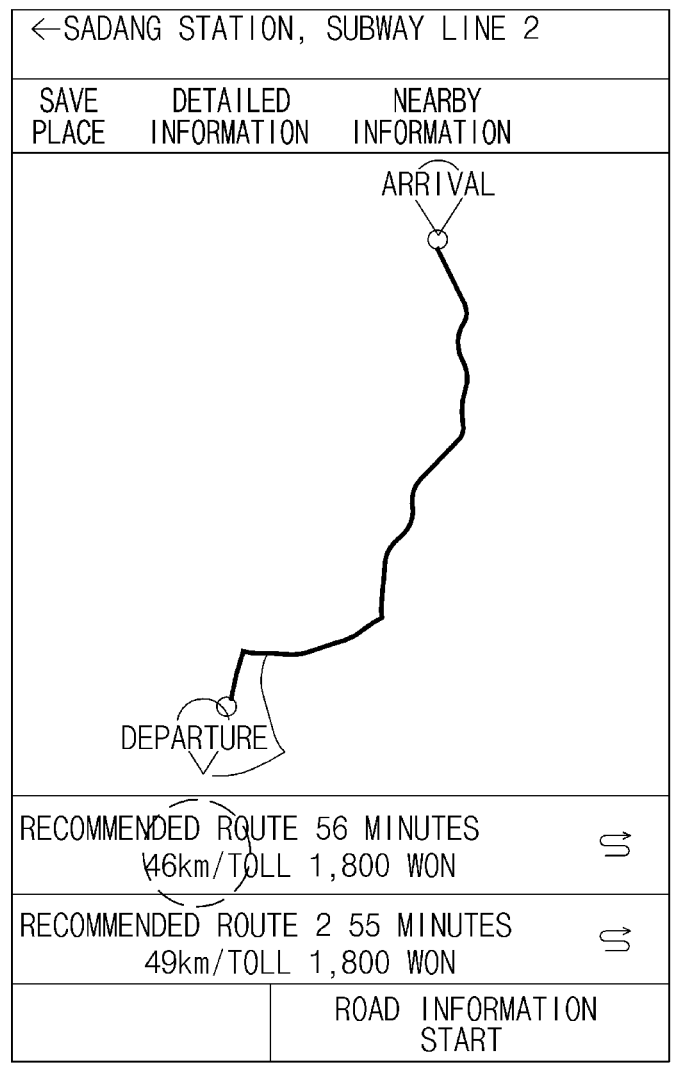
FIGS. 2 and 3 are drawings illustrating exemplary screens for light control according to a remaining distance to a destination according to an embodiment of the present disclosure.
Figure 3:
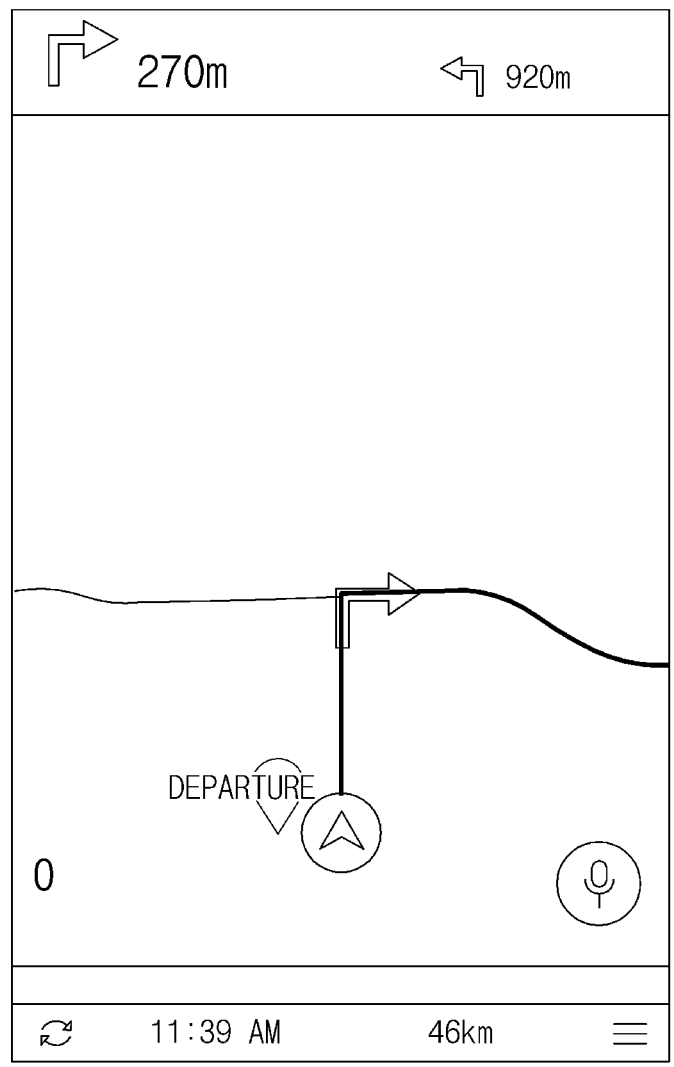

FIGS. 2 and 3 are drawings illustrating exemplary screens for light control according to a remaining distance to a destination according to an embodiment of the present disclosure.

Referring to FIG. 2, in an existing technology, after riding in an autonomous robo-taxi and entering a destination, a customer may only check a distance from the current location to the destination and an estimated time of arrival on the screen.

Referring to FIG. 3, in an embodiment of the present disclosure, after riding in an autonomous robo-taxi, a customer may recognize a remaining distance to a destination using a change in brightness of a mood lamp without checking the distance to the destination and an estimated time of arrival on the screen For example, after a customer enters a destination, when a distance from the current location to the destination is 46 km, an embodiment of the present disclosure may divide a change in brightness of the mood lamp into ten stages and may increase a brightness of the mood lamp as the customer is closer to the destination.

Figure 4:
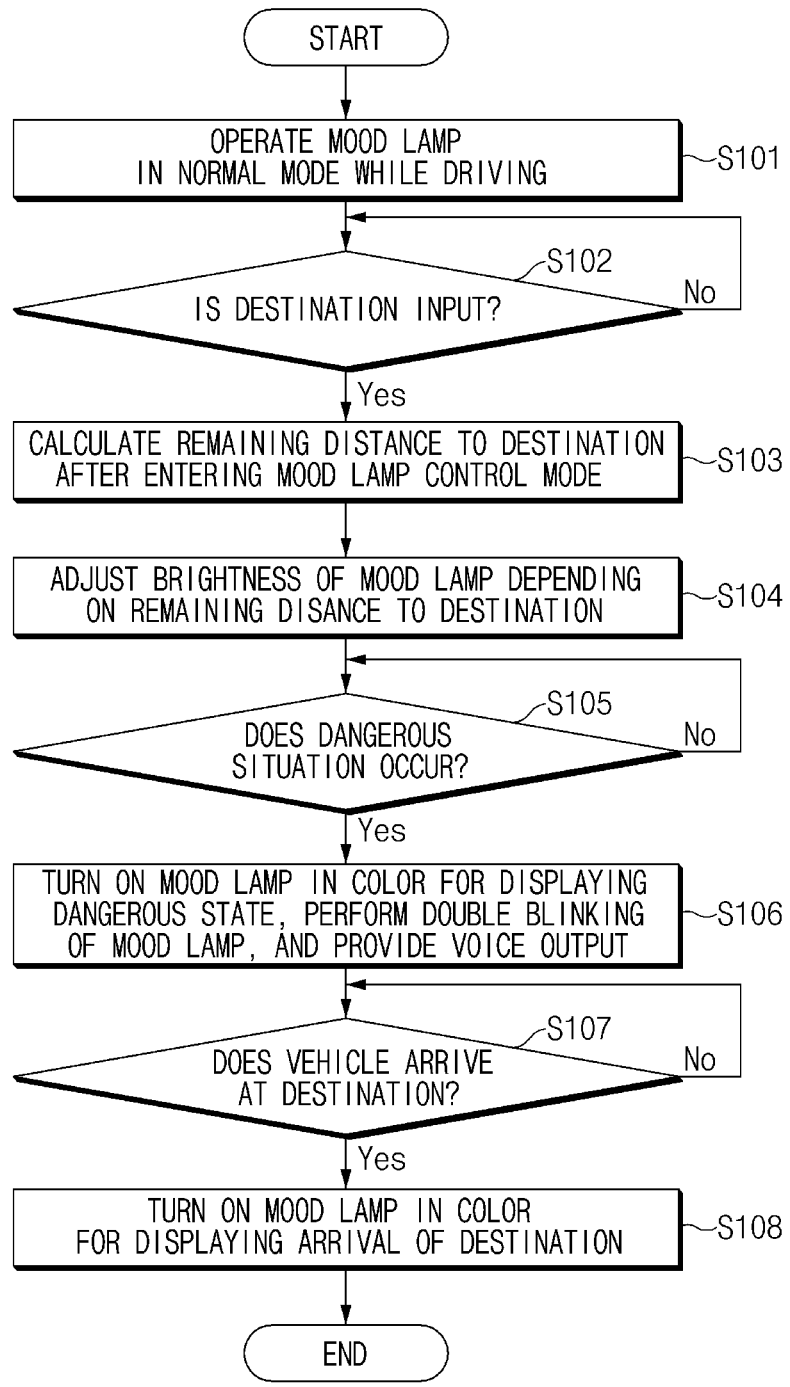
FIGS. 4 and 5 are flowcharts illustrating a light control method for a vehicle according to an embodiment of the present disclosure.

For example, an embodiment of the present disclosure may increase the brightness of the mood lamp by 10% at a distance of 4.6 km or less from a starting point. An embodiment of the present disclosure may increase the brightness of the mood lamp by 20% at a distance of more than 4.6 km and 9.2 km or less. An embodiment of the present disclosure may increase the brightness of the mood lamp by 30% at a distance of more than 9.3 km and 13.9 km or less. An embodiment of the present disclosure may increase the brightness of the mood lamp to 100% at a distance of from more than 41.4 km to the destination. An embodiment of the present disclosure may turn off the mood lamp in the state when the brightness of the mood lamp is increased to 100%, when the vehicle arrives at the destination Hereinafter, a description will be given in detail of a light control method for the vehicle according to an embodiment of the present disclosure with reference to FIG. 4. FIG. 4 is a flowchart illustrating a light control method for the vehicle according to an embodiment of the present disclosure.

Hereinafter, it is assumed that a light controller 100 for the vehicle in FIG. 1 performs a process of FIG. 4. Further, in a description of FIG. 4, an operation described as being performed by an apparatus may be understood as being controlled by a processor 130 of the light controller 100 for the vehicle.

Referring to FIG. 4, in S101, the apparatus may operate a mood lamp in a normal mode while driving. In this case, the normal mode may be a mode where the mood lamp is used as an interior function in an autonomous robo-taxi. In other words, while the autonomous robo-taxi is traveling without a customer, the mood lamp may operate in the normal mode.

In S102, the apparatus may determine whether a destination is input. In other words, when the destination is input, the apparatus may determine that a passenger rides in the vehicle.

When the destination is input, in S103, the apparatus may enter a mood lamp control mode to provide the passenger with information by controlling the mood lamp.

In S104, the apparatus may adjust a brightness of the mood lamp depending on a remaining distance to the destination. For example, the shorter the remaining distance, the brighter the apparatus may adjust the brightness of the mood lamp to be. Alternatively, the apparatus may differently set a color of the mood lamp for each remaining distance to the destination. Further, when the vehicle is close to the destination, the apparatus may control the mood lamp to quickly blink.

In S104, the apparatus may determine whether a dangerous situation occurs while driving.

When the dangerous situation occurs, in S105, the apparatus may turn on the mood lamp (e.g., turn on the mood lamp in a red color), may perform double blinking of the mood lamp, and may provide a voice output to display a dangerous state. For example, the apparatus may turn on the mood lamp in a green color in a normal driving situation and may turn on the mood lamp in a red color in a dangerous situation. Further, the apparatus may control the mood lamp to perform double blinking in a state where the mood lamp is turned on in the red color. Further, the apparatus may output a warning about a dangerous situation as a voice in a state where the mood lamp is turned on in the red color. Further, the apparatus may increase the brightness of the mood lamp to 100% in the dangerous situation and may control the mood lamp to blink in the state where the brightness of the mood lamp increases to 100%.

In S106, the apparatus may determine whether the vehicle arrives at the destination. In this case, the apparatus may determine whether the vehicle arrives at the destination, using navigation information, global positioning system (GPS) information, information about a remaining distance to the destination, or the like.

When the vehicle arrives at the destination, in S107, the apparatus may change a color of the mood lamp and may turn on the mood lamp in the changed color to notify a passenger that the vehicle arrives at the destination As such, an embodiment of the present disclosure may turn on the mood lamp in a different color for each remaining distance to the destination or may differently adjust the brightness of the mood lamp, such that the passenger may recognize the remaining distance to the destination using only a change in the mood lamp without identifying the remaining distance to the destination. Further, when a dangerous situation occurs, an embodiment of the present disclosure may change a color of the mood lamp and may turn on the mood lamp in the changed color, may control the mood lamp to blink, or may provide a voice output, such that the passenger may recognize the dangerous situation. Further, an embodiment of the present disclosure may change a color of the mood lamp and may turn on the mood lamp in the changed color, such that the passenger may intuitively know a destination arrival state when the vehicle arrives at the destination Thus, the passenger who rides in an autonomous robo-taxi or the like may know the remaining distance to the destination, the dangerous situation, whether the vehicle arrives at the destination, or the like, using only the change in the mood lamp.

Figure 5:
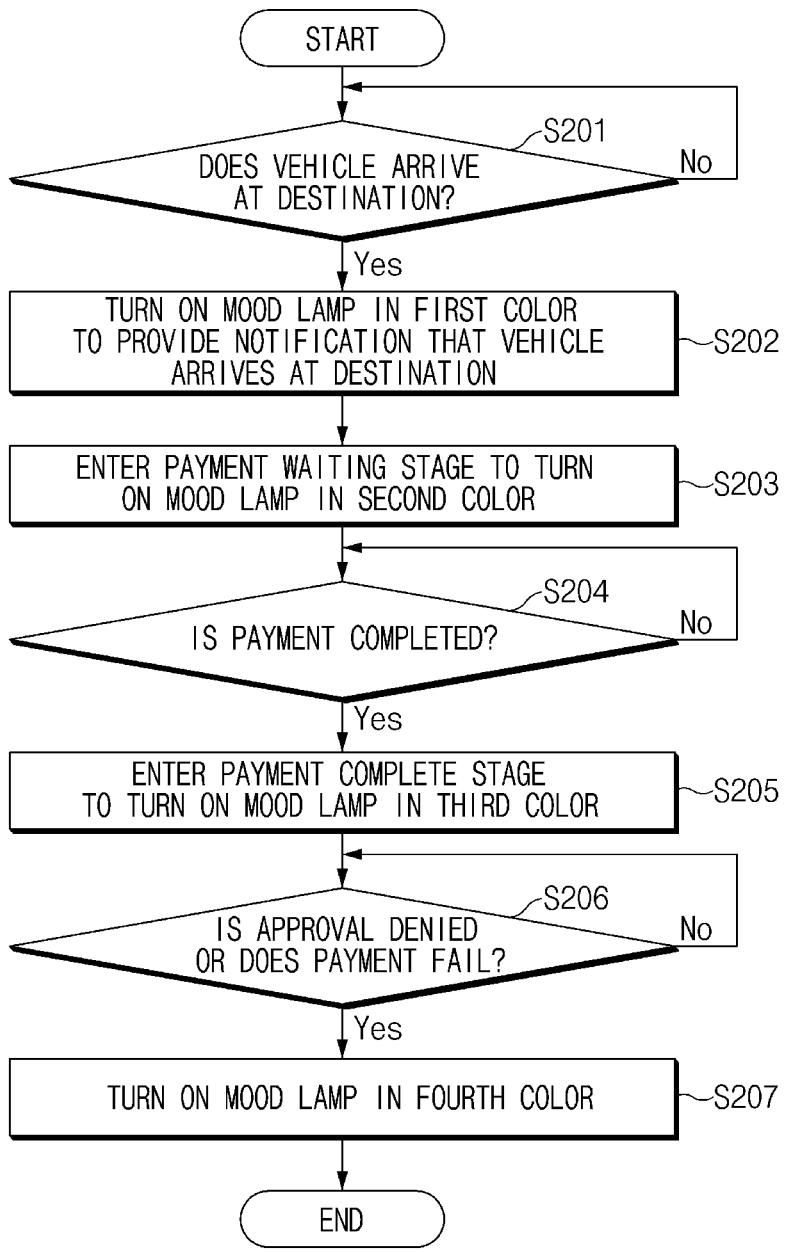

Hereinafter, a description will be given in detail of a light control method for the vehicle according to an embodiment of the present disclosure with reference to FIG. 5. FIG. 5 is a flowchart illustrating a light control method for the vehicle according to an embodiment of the present disclosure.

Hereinafter, it is assumed that a light controller 100 for the vehicle in FIG. 1 performs a process of FIG. 5. Further, in a description of FIG. 5, an operation described as being performed by an apparatus may be understood as being controlled by a processor 130 of the light controller 100 for the vehicle.

In S201, the apparatus may determine whether the vehicle arrives at a destination. When the vehicle arrives at the destination, in S202, the apparatus may turn on a mood lamp in a first color to provide a notification that the vehicle arrives at the destination. For example, the first color may be a yellow color.

After an autonomous robo-taxi (the vehicle) arrives at the destination, in S203, the apparatus may enter a payment waiting stage to pay a fare of the autonomous robo-taxi (the vehicle) and may turn on the mood lamp in a second color to guide a passenger to pay, thus notifying the passenger of the payment waiting state. For example, the second color may be an orange color. At this time, although another command is input to guide the passenger to pay, the apparatus may ignore the other command and may perform control for payment guidance in order of highest priority. Further, the apparatus may increase the brightness of the mood lamp to 100% in the payment waiting stage such that the passenger may recognize the payment waiting stage.

In S204, the apparatus may determine whether the passenger pays the fare. When the payment is completed, in S205, the apparatus may enter a payment complete stage and may turn on the mood lamp in a third color to display that the payment is completed. For example, the third color may be a yellow color.

In S206, the apparatus may determine whether approval for the completed payment is denied or whether the payment fails. When it is determined that the approval for the completed payment is denied or that the payment fails, in S207, the apparatus may turn on the mood lamp in a fourth color. For example, the fourth color may be a red color. Further, when the payment fails or when the approval for the payment is denied, the apparatus may increase the brightness of the mood lamp to 100% such that the passenger may recognize that the payment fails or that the approval is denied.

As such, an embodiment of the present disclosure may notify the passenger of a payment progress stage by use of the mood lamp after the passenger who rides in the autonomous robo-taxi arrives at the destination, such that the passenger may easily recognize the payment state.

Figure 6:
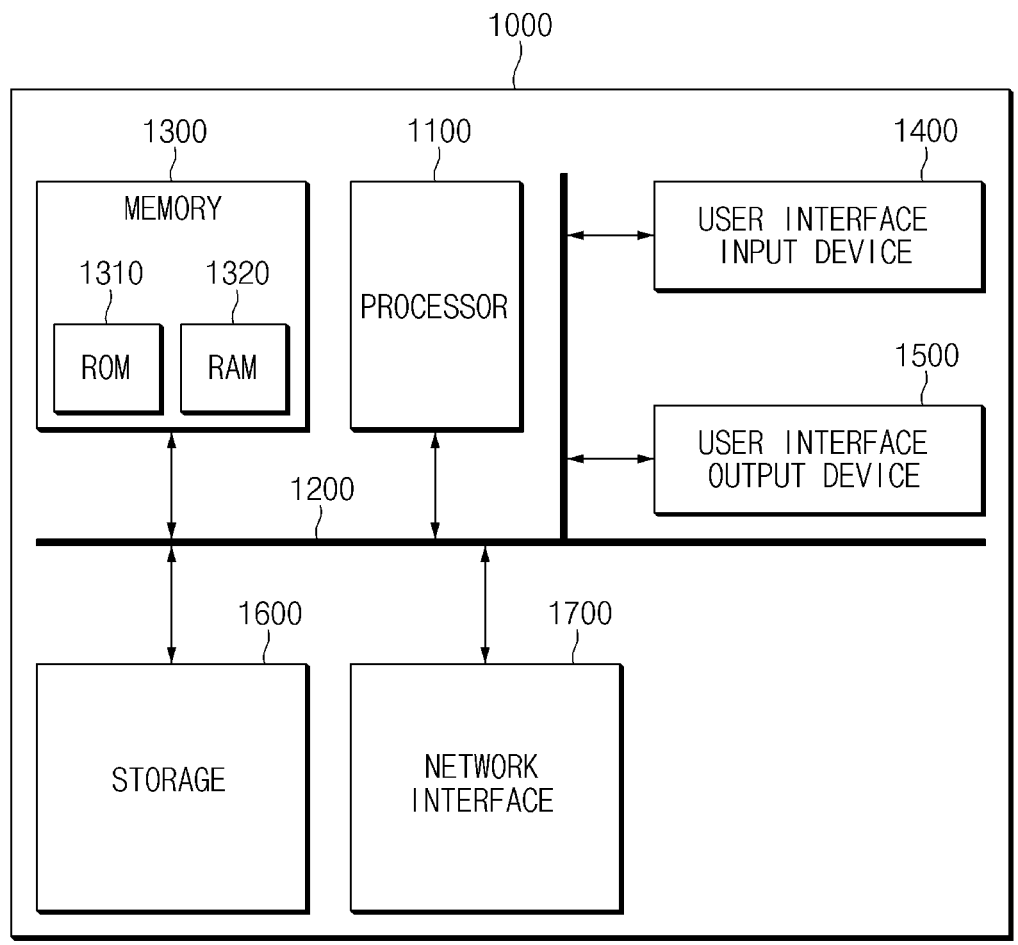
FIG. 6 is a block diagram illustrating a computing system according to an embodiment of the present disclosure.

FIG. 6 is a block diagram illustrating a computing system according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may control a light device in an autonomous commercial vehicle or the like and may allow the passenger to recognize a variety of information, thus increasing convenience of the passenger.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A light controller for a vehicle, the light controller comprising:
a processor configured to control an operation of a light device in the vehicle depending on a driving situation and a situation of paying a fare for use of the vehicle; and
a storage configured to store data for driving of the processor,
wherein the situation of paying a fare for use of the vehicle includes a payment waiting stage, a payment complete stage, and a payment fail stage.

2. The light controller of claim 1, wherein the processor controls at least one of a brightness, a color, a blinking speed of the light device depending on a remaining distance to a destination.

3. The light controller of claim 1, wherein the processor increases a brightness of the light device as a remaining distance to a destination is shorter.

4. The light controller of claim 1, wherein the processor divides a remaining distance to a destination into predetermined intervals, and adjusts a brightness of the light device for each predetermined interval or turns on the light device in a color divided for each predetermined interval.

5. The light controller of claim 1, wherein the processor controls a brightness or color of the light device to provide a notification that the driving situation is a dangerous situation or that the vehicle arrives at a destination, when the driving situation is the dangerous situation or when the vehicle arrives at the destination.

6. The light controller of claim 5, wherein the processor increases the brightness of the light device to a maximum value or increases a blinking speed of the light device, when the driving situation is the dangerous situation or when the vehicle arrives at the destination.

7. The light controller of claim 5, wherein the processor controls to output a voice for warning about the dangerous situation or providing a notification that the vehicle arrives at the destination, when the driving situation is the dangerous situation or when the vehicle arrives at the destination.

8. The light controller of claim 1, wherein the processor turns on the light device in a first color, after the vehicle arrives at a destination and enters the payment waiting stage to turn on the light device in a second color different from the first color.

9. The light controller of claim 8, wherein the processor increases a brightness of the light device to a maximum value or controls the light device to blink, in the payment waiting stage.

10. The light controller of claim 8, wherein the processor turns on the light device in a third color different from the second color, when payment is completed by a passenger of the vehicle in the payment complete stage.

11. The light controller of claim 10, wherein the processor turns on the light device in a fourth color different from the third color, when the payment by the passenger fails or when approval for the payment is denied in the payment fail stage.

12. The light controller of claim 1, wherein the driving situation includes at least one of a change in remaining distance to a destination, when the driving situation is a dangerous situation, or whether the vehicle arrives at the destination.

13. A vehicle system, comprising:
a light device in a vehicle; and
a light controller configured to control an operation of the light device depending on a driving situation and a situation of paying a fare for use of the vehicle,
wherein the situation of paying a fare for use of the vehicle includes a payment waiting stage, a payment complete stage, and a payment fail stage.

14. The vehicle system of claim 13, wherein the light controller controls on/off, a color, a brightness, and blinking of the light controller depending on at least one of a change in remaining distance to a destination, whether the driving situation is a dangerous situation, or whether the vehicle arrives at the destination.

15. A light control method for a vehicle, the method comprising:
- determining, by a light controller, a driving situation or a situation of paying a fare for use of the vehicle; and
- controlling, by the light controller, an operation of a light device in the vehicle depending on the driving situation and the situation of paying the fare for use of the vehicle,
- wherein the situation of paying a fare for use of the vehicle includes a payment waiting stage, a payment complete stage, and a payment fail stage.

16. The method of claim 15, wherein controlling the operation of the light device in the vehicle includes:
- increasing a brightness of the light device as a remaining distance to a destination is shorter.

17. The method of claim 15, wherein controlling the operation of the light device in the vehicle includes:
- increasing a brightness of the light device to a maximum value or increasing a blinking speed of the light device, when the driving situation is a dangerous situation or when the vehicle arrives at a destination.

18. The method of claim 15, wherein controlling the operation of the light device in the vehicle includes:
- turning on the light device in a first color, after the vehicle arrives at a destination;
- entering the payment waiting stage for guiding a passenger of the vehicle to pay to turn on the light device in a second color different from the first color; and
- turning on the light device in a third color different from the second color, when payment is completed by the passenger in the payment complete stage.

19. The method of claim 18, wherein controlling the operation of the light device in the vehicle further includes:
- turning on the light device in a fourth color different from the third color, when the payment by the passenger fails or when approval for the payment is denied in the payment fail stage.

20. The method of claim 15, further comprising:
- providing a voice output when controlling the operation of the light device in the vehicle.

* * * * *